(12) United States Patent
Huss et al.

(10) Patent No.: US 8,771,492 B2
(45) Date of Patent: Jul. 8, 2014

(54) DEVICE AND METHOD FOR ELECTROCHEMICAL TREATMENT

(75) Inventors: Rainer Huss, Buchenberg (DE); Patrick Matt, Marktoberdorf (DE); Rene Wodrich, Kempten (DE); Ulrich Franz Burmester, Bad Wurzach (DE)

(73) Assignee: Kennametal Inc., Latrobe, PA (US)

( * ) Notice: Subject to any disclaimer, the term of this patent is extended or adjusted under 35 U.S.C. 154(b) by 598 days.

(21) Appl. No.: 12/672,398

(22) PCT Filed: Sep. 12, 2008

(86) PCT No.: PCT/EP2008/062196
§ 371 (c)(1),
(2), (4) Date: Jul. 7, 2011

(87) PCT Pub. No.: WO2009/037209
PCT Pub. Date: Mar. 26, 2009

(65) Prior Publication Data
US 2011/0253537 A1 Oct. 20, 2011

(30) Foreign Application Priority Data
Sep. 14, 2007 (DE) .......................... 10 2007 049 495

(51) Int. Cl.
*B01D 61/42* (2006.01)

(52) U.S. Cl.
USPC ........... 204/518; 204/627; 204/520; 204/450; 205/96; 205/136

(58) Field of Classification Search
None
See application file for complete search history.

(56) References Cited

U.S. PATENT DOCUMENTS

| 4,746,413 A | 5/1988 | Pott et al. |
| 5,783,061 A | 7/1998 | Schuurman et al. |
| 6,669,833 B2* | 12/2003 | Kaja et al. ........................ 205/96 |
| 2005/0183955 A1* | 8/2005 | Crowley et al. ............... 204/450 |
| 2007/0158194 A1* | 7/2007 | Lincourt et al. .............. 204/518 |

FOREIGN PATENT DOCUMENTS

| DE | 3542820 A1 | 6/1987 |
| EP | 1714725 A1 | 10/2006 |
| JP | 62074529 A | 4/1987 |
| JP | 63047386 A | 2/1988 |
| JP | 06182346 A | 7/1994 |
| WO | 9735810 A2 | 10/1997 |

OTHER PUBLICATIONS 08-27-2013-KEH-2559DEJP!-Notice_Office Action.

* cited by examiner

*Primary Examiner* — Keith Hendricks
*Assistant Examiner* — Timon Wanga
(74) *Attorney, Agent, or Firm* — Matthew W. Smith, Esq.

(57) ABSTRACT

The present invention relates to a method and device for the electrochemical treatment of at least one component, which has a treatment chamber and at least one feed unit for an electrolyte to the treatment chamber, and at least one way for setting the pH value of the electrolyte being provided before the treatment chamber.

10 Claims, 1 Drawing Sheet

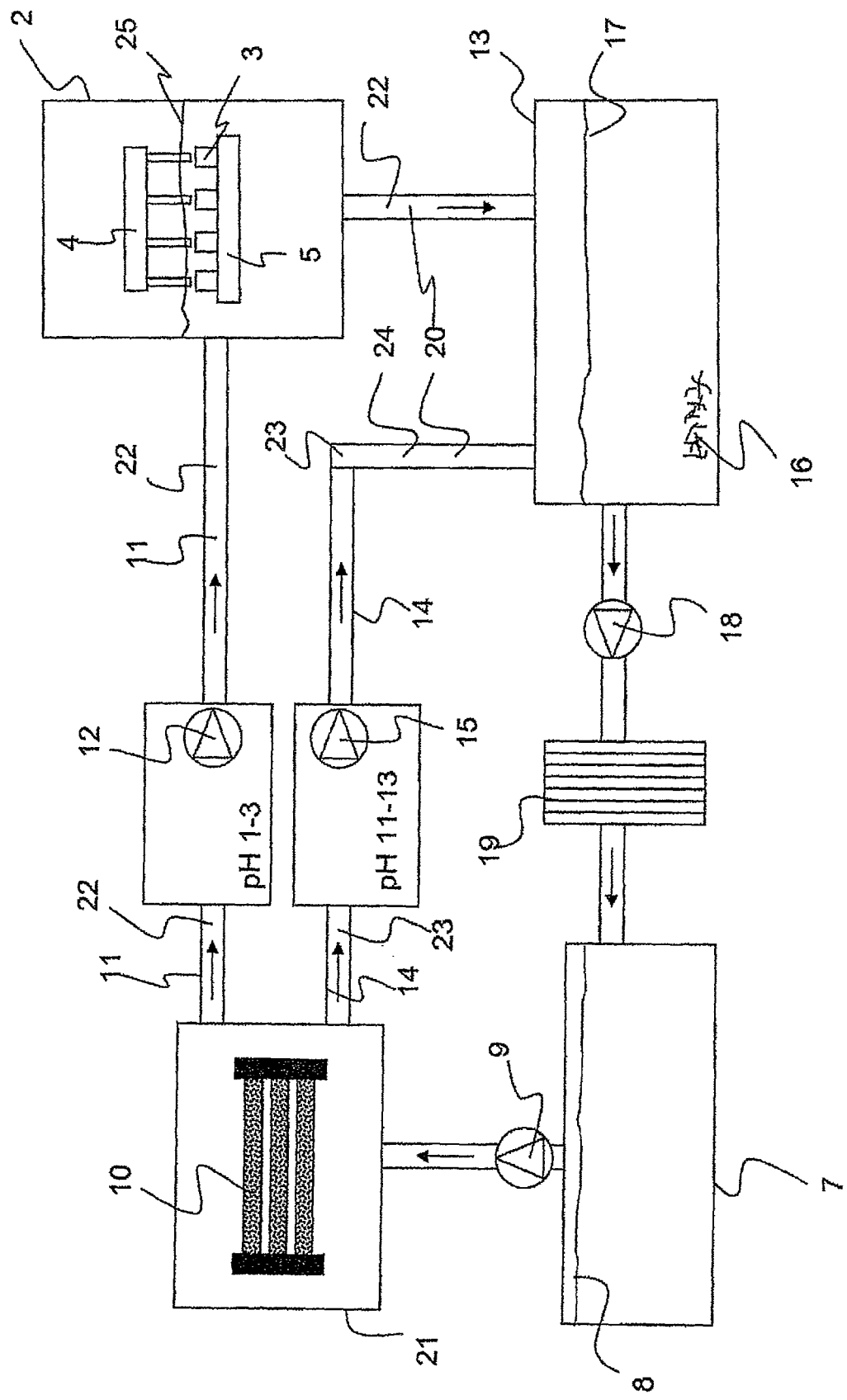

DEVICE AND METHOD FOR ELECTROCHEMICAL TREATMENT

BACKGROUND OF THE INVENTION

1) Field of the Invention

The present invention relates to a method and a device for the electrochemical treatment of at least one component. The electrochemical treatment of components makes it possible to have an especially accurate treatment of electrically conductive and therefore metallic components. Treatment takes place virtually free of wear and with particular care being taken over the material. The invention is employed, in particular, in the industrial sector and where large quantities are involved.

2) Description of the Prior Art

Electrochemical treatment functions on the principle of electroerosion. For this purpose, for example, the component is contacted anodically and the tool cathodically. A conductive liquid, which is also designated as an electrolyte, is pumped through a working gap remaining between the component and the tool. When an electrical voltage is applied between the component and tool, a current flows and initiates electrolysis, by means of which metal ions are released from the component. In this case, a defined erosion of the material is achieved. With the aid of electrochemical treatment, radii and contours can be manufactured with high accuracy even at locations where access is difficult. Furthermore, it is possible to treat various component positions simultaneously. Since no direct contact occurs between the tool and the component, treatment takes place virtually free of wear, and a highly constant process quality is ensured. Moreover, no mechanical stresses or thermal influences are induced in the component to be treated. Even materials which are difficult to cut can be treated without difficulty by means of this treatment method. On account of short cycle times, which may amount to a few seconds, it is possible to treat considerable quantities with a high degree of process reliability. This method is in especially widespread use in the remachining of ducts in injection nozzles.

When devices for the electrochemical treatment of components are in operation, it has proved to be a disadvantage that deposits may occur under specific circumstances. Thus, the metals released during electrochemical treatment may, for example, form metal hydroxides. These metal hydroxides may cause problems, for example in that they form deposits, particularly in the form of layers on the workpieces and cathodes. Sometimes, for example, it may also happen in the case of very thin cathode tubes and other relatively small orifices that these are closed completely or partially by such deposits and are therefore blocked for the electrolyte.

The object of the invention, therefore, is to solve at least partially the problems arising from the prior art and, in particular, to specify a device and a method, with the aid of which such deposits can be at least reduced, if not avoided entirely.

SUMMARY OF THE INVENTION

These objects are achieved by means of a method according to the features of patent claim 1 and a device according to the features of patent claim 10. Further advantageous refinements of the invention are specified in the dependently formulated patent claims. It should be pointed out that the features listed individually in the dependently formulated patent claims may be combined with one another in any technologically expedient way and define further refinements of the invention. Furthermore, the features specified in the patent claims are more particularly detailed and explained in the description, further preferred exemplary embodiments of the invention being illustrated.

In the present case, the object is achieved by means of a method for the electrochemical treatment of at least one component, the component being surrounded at least partially by an electrolyte, and the method comprising the steps:

a) generation of at least one change in a pH value of the electrolyte;

b) supply of the pH value-modified electrolyte to the at least one component.

The method referred to here is, in particular, an electrochemical treatment method for the erosion of material on a workpiece, an electrical voltage being applied between the workpiece and tool, and an electrolyte being fed in at least temporarily in an intermediate region (gap) of the workpiece and tool. The term "generation" of an electrolyte means, in particular, that a corresponding composition of the electrolyte is actively set, mixed and/or compiled so that the desired pH value is obtained. This electrolyte quantity (if appropriate, briefly stored intermediately) is then supplied in a directed manner to the predetermined treatment process. In this case, the pH value may basically be varied and/or also (temporarily) kept constant during the method for the electrochemical treatment of the component. What "generation" means most particularly is that the electrolyte is only produced, that is to say there is no question only of a straightforward addition of an additive to an existing electrolyte.

It became apparent surprisingly that, in an acid electrolyte, the released metals do not form metal hydroxides. If, therefore, the change in the pH value of the electrolyte involves, for example, a lowering of the pH value, the electrolyte thus modified can be introduced in the treatment space for electrochemical treatment. During subsequent electrochemical treatment, in this case none of the deposits described above and unwanted in the prior art occur within the treatment space or elsewhere in the machine. In addition to said advantageous pH value reduction, however, the pH value of the electrolyte may also be increased. Alternatively, the pH value may simultaneously be increased in one part of the electrolyte and be reduced in a further part of the electrolyte. For this purpose, therefore, the electrolyte is, where appropriate, monitored or, where appropriate, regulated or controlled in terms of its pH value (constantly and, if appropriate, in situ), so that, for the given treatment situation, a formation of, in particular, metal hydroxides is markedly reduced and, for example, is kept exactly below a minimum value.

This may advantageously take place in that the pH value at least in a first part stream of the electrolyte is reduced and/or in at least one second part stream of the electrolyte is increased. It consequently becomes possible to conduct the pH value-reduced part stream through the treatment space for electrochemical treatment and to conduct the pH value-increased part stream of the electrolyte past this treatment space. Thus, for example, an originally pH value-neutral electrolyte may be used, and at the same time the set object according to the invention achieved.

It is in this case most especially advantageous if the reduced pH value and the increased pH value are selected so that the associated part streams can be mutually neutralized. Moreover, in the implementation of the method according to the invention, it has proved advantageous if the first part stream having the reduced pH value is conducted to the at least one component, since the deposits on the components to be treated and in the treatment space are thereby avoided.

Furthermore, it is advantageous if the part streams having the increased pH value are conducted past the at least one component. An originally neutral electrolyte is in this case divided into part streams having different pH values. As already described above, part streams can then be conducted correspondingly through the treatment space or past this.

Furthermore, it is also advantageous if the two part streams are combined, downstream of the at least one component, for the neutralization. On the one hand, it is then no longer necessary to design the device, in the region downstream of the neutralization point, so as to be acid-resistant or base-resistant, as would otherwise be necessary for electrolytes having especially high or low pH values. In particular, in specific parts of the treatment plant, acid-resistant or base-resistant components, such as, for example, pipelines and pumps, may be dispensed with if the electrolyte is neutralized again in these part regions. Furthermore, it became apparent that, during neutralization, the released metals form what are known as hydroxides and can be separated or precipitated from the electrolyte by known means, such as, for example, filter systems.

For continuous operation, it has proved beneficial if the electrolyte is circulated in a closed circuit. As a result, the required electrolyte volume is reduced to a minimum and an unnecessary occurrence of spent electrolyte is avoided.

Moreover, in another most especially preferred embodiment of the present invention, there is provision for an electrodialysis method to be used for setting the pH value. Such an electrodialysis method may be carried out, for example, by means of an electrodialysis cell. Electrodialysis is an electrochemically driven membrane process in which ion exchanger membranes are used in combination with an electrical potential difference in order to separate ionic constituents. With the aid of such electrodialysis cells, it is possible to separate an electrolyte into an acid and a basic constituent. Each of these constituents can form a part stream according to the invention which can be employed within the scope of the method according to the invention. In particular, it has proved appropriate to use an acid part stream with a pH value of between 1 and 3 and a basic part stream with a pH value of 11 to 13. Furthermore, it has been shown that, after electrochemical treatment has taken place, the pH value of the acid part stream can be increased by the addition of the basic part stream to an extent such that the released metal fractions form hydroxides. This can advantageously be implemented especially in the range of pH values of between 7 and 9, in particular at a pH value of 8.

Furthermore, the objects according to the invention can also be achieved by means of a device for the electrochemical treatment of at least one component, which device has at least one treatment space and at least one supply arrangement for supplying an electrolyte to the treatment space. In this case, at least one setting means for changing the pH value of the electrolyte is provided upstream of the treatment space. Such a setting means may consist, for example, of a reservoir for an acid or a base or of a metering arrangement, by means of which the acid or base is added in the desired quantity to the electrolyte. By a setting means configured in this way, the pH value of the electrolyte can be lowered or raised selectively and in a directed manner (for example, in terms of the time point, quantity, averaged pH value within a small tolerance range, etc.). Alternatively, however, the use of at least two setting means may also be provided, in order, for example, to reduce the pH value in one part stream and to increase the pH value in another part stream.

The device referred to here is suitable particularly for carrying out the method described according to the invention, and therefore reference is made in full here to the corresponding explanations.

It is especially preferable to select the setting means so that it is suitable for increasing and/or reducing the pH value. For this purpose, in a most especially preferred embodiment of the invention, there is provision for the setting means to be an electrodialysis cell. The electrodialysis cell is capable of dividing an existing electrolyte. The pH value of one part of the electrolyte is in this case reduced, whereas the pH value of the other part of the electrolyte is increased. The part quantities of the electrolyte which are divided by means of the electrodialysis cell can be discharged in separate part streams from the electrodialysis cell. One part stream, to be precise that with the lowered pH value, is for this purpose preferably conducted through the treatment space, whereas the second part stream, to be precise that with the increased pH value, is preferably conducted past the treatment space.

Advantageously, for this purpose, on the device the supply arrangement is designed so that it has first conduction means for an electrolyte with reduced pH value. This first conduction means guides the pH value-modified electrolyte from the setting means into the treatment space.

Furthermore, there is advantageously provision for the supply arrangement to have a second conduction means for an electrolyte with an increased pH value. This second conduction means conducts the electrolyte away from the setting means and past the treatment space.

As already mentioned in connection with the method described above, the device according to the invention is advantageously designed so that the supply means is designed as a closed circuit. As a result, the electrolyte used can circulate within the treatment device and does not constantly have to be discharged or replaced by new electrolyte.

Both for the method according to the invention and for the device according to the invention, it is advantageous, in the case of continuous operation, if the electrolyte is filtered via means of a filter arrangement. As a result, the metals dissolved in the electrolyte or the chemical compounds formed, which may be present, for example, as suspended substances, can be filtered out of the electrolyte. In particular, chamber-type filter presses are used as filter arrangement.

Furthermore, within the scope of the present invention, there may advantageously be provision for one part stream, in particular a part stream with an increased pH value, to be divided and admixed at different locations in the circuit to the part stream with a reduced pH value.

Moreover, it may also be advantageous if, in part regions, in particular those lying downstream of the treatment space, the pH value of the part stream discharged from the treatment space is increased up to a range of between the pH values 7 and 9. The formation of metal hydroxides can thereby be achieved in an especially efficient way, and these are subsequently removed from the electrolyte, for example, by means of the filter systems. In this case, the setting means designed, for example, as an electrodialysis cell may, under certain circumstances, be assisted additionally by a metered addition of basic electrolyte or of other basic substances.

Furthermore, within the scope of the present invention, there may advantageously be provision for arranging downstream of the treatment space at least one neutralization tank, in which the part streams with a reduced and with an increased pH value are combined before they are conducted further on in a completely or at least partially neutralized form into a reservoir. Preferably, the filter arrangements provided are arranged upstream of this reservoir, so that only fresh electrolyte ready for further circulation is contained in the reservoir.

BRIEF DESCRIPTION OF THE DRAWINGS

The invention and the technical background are explained in more detail below by means of the FIGURE. It should be pointed out that the FIGURE shows an especially preferred design variant of the invention, to which, however, it is not restricted. In the diagrammatic drawing:

FIG. 1: shows a treatment device according to the invention with setting means and with two part streams.

DETAILED DESCRIPTION OF THE INVENTION

FIG. 1 illustrates a treatment device 1 according to the invention for electrochemical treatment. Illustrated at the top right is a treatment space 2 in which four components 3 are arranged for electrochemical treatment. The components 3 are fastened to an anode 5. Above the components 3 is located the cathode 4 provided correspondingly for the treatment. In addition, an electrolyte 6 is stored inside the treatment space 2 and wets and washes around the components 3.

The functioning of the treatment device illustrated is described below, starting from a reservoir 7. The reservoir 7 contains a pH value-neutral electrolyte 8. Neutral is understood in the present case to mean a pH value of approximately 7. Depending on the application, however, an electrolyte with another pH value may be selected as a starting point. The neutral electrolyte 8 is pumped by means of a first pump 9 to an electrodialysis cell 10 where a change in the pH value takes place. The electrodialysis cell 10 in this case forms a setting means 21 for setting the desired pH value.

A pH value change is understood within the scope of the present invention to mean, in particular, a continuously generated variation in a pH value. This means that the pH value experiences a jump in value at the setting or changing means. This variation is continuous during electrochemical treatment and thereby differs from a once-only setting of the pH value, such as is carried out once, for example, during the filling of a treatment device 1 with a pH value.

The electrodialysis cell 10 divides the initially neutral electrolyte 8. In this case, the pH value of a part of the electrolyte is lowered and the pH value of a part of the electrolyte is increased. The pH value-reduced part of the electrolyte 25 has in this case preferably a pH value of between 1 and 3, whereas the pH value-increased part of the electrolyte 24 has a pH value of between 11 and 13. The pH value-reduced part of the electrolyte 25 is conveyed via a first part stream 11 by means of a second pump 12 into the treatment space 2 via first conduction means 22. Consequently, only an acid pH value-reduced electrolyte 25 is contained in the treatment space 2. After the electrolyte has washed around the components 3, it is discharged further on into a neutralization tank 13 via the first part stream 11.

That part of the electrolyte 24 of which the pH value is increased at the electrodialysis cell 10 is conveyed via a second part stream 14 by means of a third pump 15 through second conduction means 23 past the treatment space 2 into the neutralization tank 13. In the neutralization tank 13, the first part stream 11 and the second part stream 14 are intermixed, neutralization taking place. In this case, under certain preconditions, part of the material released from the components 3 in the treatment space 2 may react. In particular, the metals dissolved in the electrolyte 25 of the first part stream 11 may react in the neutralization tank to form metal hydroxides and may be deposited as solids 16 on the bottom of the neutralization tank 13. The neutralized electrolyte 17 is conveyed further by a fourth pump 18 from the neutralization tank 13 through a filter arrangement 19 into the reservoir 7.

By means of the filter arrangement 19, the remaining suspended substances present in the electrolyte 17 are filtered out, so that only purified and neutral electrolyte 8 is ready in the reservoir 7 for further circulation in the circuit of the treatment device 1.

The treatment device 1 thus configured according to the invention consequently efficiently prevents the formation of deposits on components or electrodes, such as the cathode 4 and anode 5.

Electrochemical treatment in the treatment device 1 according to the invention can consequently be carried out free of deposits. Moreover, a circulation and therefore multiple utilization of the electrolyte 8 over particularly long operating times are possible, and therefore the treatment costs also fall.

Moreover, the present invention is not restricted to the embodiments illustrated. On the contrary, numerous modifications of the invention within the scope of the patent claims are possible. Thus, for example, instead of the direct connection, shown in FIG. 1, between the electrodialysis cell 10 and the neutralization tank 13, the pH value-increased quantities of the electrolyte 24 may also be divided into a plurality of part streams and be admixed to the first part stream 11 at different locations, that is to say at a plurality of convergences.

Furthermore, in addition to using the electrodialysis cell as a setting means, it is also possible to arrange additional or other setting means, such as, for example, in the form of metering arrangements, at various locations in the electrolyte circuit 20, in order to carry out the desired pH value variations there.

LIST OF REFERENCE SYMBOLS

1 Treatment device
2 Treatment space
3 Component
4 Cathode
5 Anode
6 Electrolyte
7 Reservoir
8 Electrolyte, neutral and purified
9 First pump
10 Electrodialysis cell
11 First part stream
12 Second pump
13 Neutralization tank
14 Second part stream
15 Third pump
16 Solid
17 Neutralized electrolyte
18 Fourth pump
19 Filter arrangement
20 Circuit
21 Setting means
22 First conduction means
23 Second conduction means
24 Electrolyte, pH value-increased
25 Electrolyte, pH value-reduced

The invention claimed is:

1. A device for the electrochemical treatment of at least one component, comprising a treatment space, at least one supply arrangement for supplying an electrolyte to the treatment space, and at least one setting means for setting the pH value of at least two pH value-modified part quantities of the electrolyte, the setting means being provided upstream of the treatment space and downstream of an electrolyte reservoir,
wherein the treatment space comprises an anode, a cathode, a tool, and the at least one component, wherein the tool is contacted with the cathode and the at least one component is contacted with the anode, and wherein a working gap exists between the at least one component and the tool.

2. The device as claimed in claim 1, the setting means being suitable for increasing and/or reducing the pH value.

3. The device as claimed in claim 1, the setting means being an electrodialysis cell.

4. The device as claimed in claim 1, the supply arrangement having first conduction means for supplying a part quantity of electrolyte with a reduced pH value.

5. The device as claimed in claim 1, the supply arrangement having second conduction means for supplying a part quantity of electrolyte with an increased pH value.

6. The device as claimed in claim 1, the supply means being designed as a closed circuit.

7. The device as claimed in claim 1, further comprising a neutralization tank downstream of the treatment space and upstream of the electrolyte reservoir.

8. The device as claimed in claim 4, further comprising a neutralization tank downstream of the treatment space and upstream of the electrolyte reservoir.

9. The device as claimed in claim 4, the supply arrangement further comprising a second conduction means for supplying a part quantity of electrolyte with an increased pH value to a point downstream of the treatment space.

10. The device as claimed in claim 8, the supply arrangement further comprising a second conduction means for supplying a part quantity of electrolyte with an increased pH value to the neutralization tank.

* * * * *